United States Patent [19]
Gupta

[11] Patent Number: 5,838,977
[45] Date of Patent: Nov. 17, 1998

[54] TRANSLATING AN OBJECT GRAPH AT RUN TIME

[75] Inventor: Anil Gupta, Dallas, Tex.

[73] Assignee: Texas Instruments Incorporated, Dallas, Tex.

[21] Appl. No.: 473,610

[22] Filed: Jun. 7, 1995

Related U.S. Application Data

[63] Continuation of Ser. No. 785,961, Oct. 31, 1991, abandoned.

[51] Int. Cl.$^6$ ........................................................ G06F 9/45
[52] U.S. Cl. ............................................................... 395/705
[58] Field of Search ..................................... 395/700, 650, 395/704, 701, 705

[56] References Cited

U.S. PATENT DOCUMENTS

| | | | |
|---|---|---|---|
| 5,361,351 | 11/1994 | Lenkov et al. ............................ | 395/704 |
| 5,535,386 | 7/1996 | Wang ........................................ | 707/203 |
| 5,649,139 | 7/1997 | Weinreb et al. .......................... | 395/412 |

OTHER PUBLICATIONS

Kernighan et al., "The C Programming Language," Prentice Hall, Englewood Cliffs, NJ, 2nd Ed., sections 6.1 and 6.2 (pp. 127–132), 6.7 (pp. 164–147), and A12 (pp. 228–233). 1988.

Booch, Grady, "Software Components with Ada," Benjamin/Cummings Publishing, Menlo Park, CA, Ch. 2 (pp. 10–32). 1987.

*Primary Examiner*—James P. Trammell
*Assistant Examiner*—Peter J. Corcoran, III
*Attorney, Agent, or Firm*—W. Daniel Swayze, Jr.; Wade James Brady, III; Richard L. Donaldson

[57] ABSTRACT

The dbX persistent programming language model solves the problem of seamlessly providing an unfragmented, persistible, complex object heap space that extends beyond virtual memory to a program in a host programming language X. It does so without rewriting a compiler for X and without operating system or hardware dependencies. It uses a memory pointer as a pointer to a persistible object, with the lvalue of the pointer providing a hook to the OID of the object. The lvalues of pointers to persistible objects, their associated OIDs and other information about persistible objects are maintained in a global data structure. Unresolved pointers to persistible objects point to an unusable area of memory, and dereferencing them triggers object faulting. A keyword and an overloaded allocation operator are used to identify statically and dynamically allocated pieces of memory respectively as persistible. A preprocessor processes occurrences of the keyword and operator, and some operations on pointers to persistible objects in a dbX program and generates X code. Object translation uses a 'pointer view of memory' and an 'allocation view of memory' to determine the runtime structure of an object graph, and it is resilient to pointer casting and pointing to objects embedded in larger objects.

4 Claims, 2 Drawing Sheets

| lvalue | in-mem | OID | addr | size | typeobj |
|---|---|---|---|---|---|
|  |  |  |  |  |  |
Fig. 1
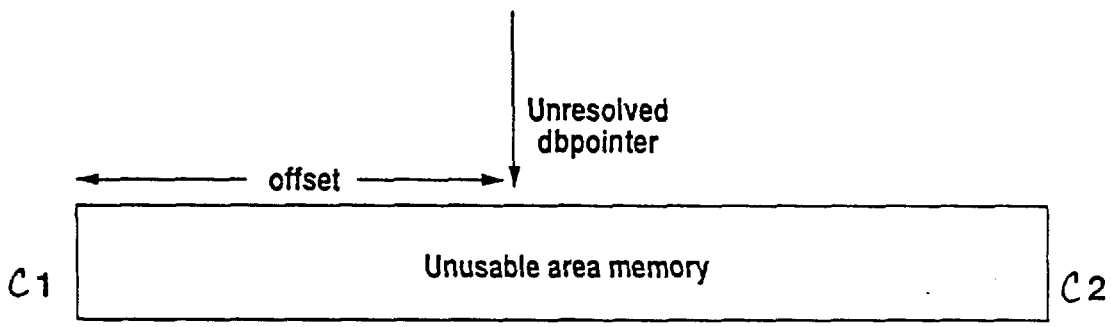
Fig. 2A
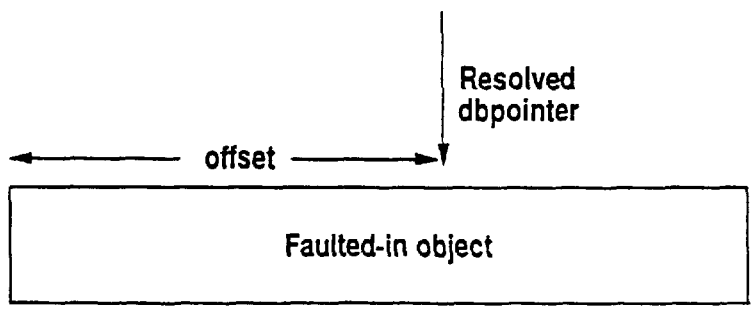
Fig. 2B

TRANSLATING AN OBJECT GRAPH AT RUN TIME

This is a Continuation of application Ser. No. 07/785,961, filed Oct. 31, 1991, now abandoned.

TECHNICAL FIELD OF THE INVENTION

This invention relates to object-oriented databases, persistent programming languages and applications that require extended heap space.

BACKGROUND OF THE INVENTION

In transient programming languages the lifetime of program data is the duration of program execution. Once a program terminates all its data disappears. The data in a program execution may not be easily reused in another execution of the same program or by another program.

On the other hand, persistent programming languages provide support for data to persist beyond program executions. Persistent data in a program execution may be accessed in another execution of the same program or by another program.

The conventional method of adding persistence to a programming language has been through the use of files. Data saved in a file during a program execution persists, and it may be reused after the execution terminates. The problem with implementing persistence via files is seamfullness. Files have to be explicitly opened, accessed, and closed and program data saved and restored via explicit function invocation. Furthermore, persistent data may not behave or be manipulable in a manner identical to transient data.

A number of languages have attempted to provide a seamless and elegant method for supporting persistence. For example, PS-Algol, an extension of Algol, allows objects with pointer-valued fields to persist, and various extensions to C++ support persistence of complex C++ objects.

However, existing persistent programming language models suffer from a variety of problems. These include existence of seams, fragmentation of heap space, dual type systems, dual language interfaces, operational incompleteness, and compiler, operating system, and hardware dependencies. Therefore, a need exists for a persistent programming language model that does not possess these problems.

SUMMARY OF THE INVENTION

The persistent programming language model described herein solves the problem of seamlessly providing an unfragmented, persistible, complex object heap space that extends beyond virtual memory to a program in a host programming language. For purposes of description, the language model is referred to herein as "dbX", and the host language is referred to as "X". The extended heap space problem is solved without rewriting a compiler for X and without operating system or hardware dependencies. Key elements of the model are: dbpointer, dbtable, dbfaulting, dbvar/dbnew( ), dbtranslation and dbpaging.

A dbpointer is a memory pointer whose lvalue is used to provide a hook to an object-identifier (OID) of a persistible object. It is used to represent a pointer in memory that points to a persistent object on disk, when only part of an object graph has been restored into memory. The lvalues of dbpointers, their associated OIDs and other information about persistible objects are maintained in a global data structure, dbtable.

When a dbpointer to a persistible object not in memory is dereferenced, dbfaulting is triggered, and the object is restored into memory. dbfaulting involves making all unresolved dbpointers point to an unusable area of memory, e.g., operating system area or system malloced area. This area is large enough to accommodate increments or decrements of unresolved dbpointers. The offset into this area gives the offset into a persistible object an unresolved dbpointer points to. When a dbpointer to such an area is dereferenced, an object fault is triggered. The OID of an object to be faulted is obtained by looking up dbtable with the lvalue of a dereferenced dbpointer.

The keyword 'dbvar' and the allocation operator 'dbnew( )' are used in a dbX program to identify statically and dynamically allocated pieces of memory respectively as persistible.

A preprocessor 'dpp' processes occurrences of dbvar, dbnew( ) and some operations on dbpointers, for example, dereferencing and assignment, in a dbX program and generates X code, which is fed to a X compiler.

dbtranslation and dbpaging are used to save persistible object graphs. dbtranslation uses a 'pointer view of memory' and an 'allocation view of memory' to determine the runtime structure of an object graph. A pointer view of memory interprets a piece of memory according to the type of a pointer or reference to it, while an allocation view of memory interprets a piece of memory based on how it is allocated. dbtranslation is resilient to pointer casting and pointing to objects embedded in larger objects.

The dbX language model has a number of distinguishing features. Migration of an arbitrary transient X program to a persistible dbX program involves no more than annotating the former with dbvar and dbnew( ) constructs along with bindings to a persistence namespace. Persistible data may be seamlessly manipulated by a dbX program even if it extends beyond virtual memory. dbX does not require a data definition language. Furthermore, the dbX model has no X-compiler, operating system, hardware or host language-specific conceptual dependencies.

dbX solves the extended heap problem, having an impact at several levels. It provides a persistent language model for an unfragmented Object Oriented Database. To a persistent-X programmer it seamlessly provides an unfragmented, persistible, complex object heap space that goes beyond virtual memory. And, to a transient-X programmer it seamlessly extends heap space beyond virtual memory.

BRIEF DESCRIPTION OF THE DRAWINGS

FIG. 1 illustrates a table the invention uses to maintain information on persistible objects and pointers to them.

FIGS. 2A and 2B illustrate details of object faulting in the invention.

DETAILED DESCRIPTION OF THE INVENTION

Introduction

Figure 3:
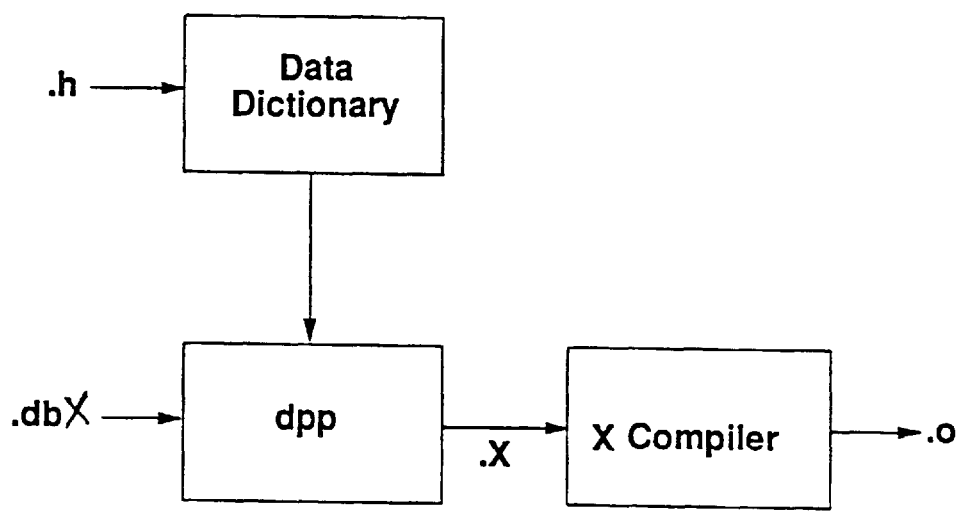
FIG. 3 illustrates the modules and data flow among them needed to support the invention.

The dbX persistent programming language model solves the problem of seamlessly providing an unfragmented, persistible, complex object heap space that extends beyond virtual memory to a program in a host programming language X. (An example of X is C++.) It does so without rewriting a compiler for X and without operating system or hardware dependencies. This is in contrast to other models, which have problems like seamfullness, fragmentation of heap space, dual type systems, dual language interfaces, operational incompleteness, operating system dependencies, hardware dependencies, and compiler rewriting.

The following description describes key elements of the dbX model: dbpointer, dbtable, dbfaulting, dbvar/dbnew( ), dbtranslation and dbpaging. A data flow diagram illustrates the role of a preprocessor and data dictionary in the model. A single user environment, transaction boundaries coinciding with the begin and end of a program, and no versioning of objects are assumed.

The Persistent Language Problem

Solving the persistent language problem entails fulfilling the following two requirements:

1) The save requirement: To be able to save an object graph from memory to disk.
2) The partial restore requirement: To be able to restore part of an object graph from disk into memory.

The object graphs in these requirements are not restricted to be containable within virtual memory.

Long Pointer

The partial restore requirement leads to the concept of 'long pointer'. A long pointer is an in-memory pointer that points to a persistible object on disk, when only part of an object graph is restored into memory. It has to reconcile two opposing requirements: providing a hook to an object identifier (OID) of a persistible object; and behaving like a memory pointer.

Seamlessness demands that the operational and type behavior of a long pointer be similar to that of a memory pointer.

dbpointer

In dbX a long pointer is represented as a dbpointer.

A dbpointer is a memory pointer whose lvalue is used to provide a hook to an OID. (By lvalue of a pointer 'p' is meant the address of a memory cell for 'p', i.e. &p. This should not be confused with the value (rvalue, to be precise) of 'p', which is the contents of the memory cell for 'p', representing the address of the object it points to.)

The lvalue of a dbpointer, the OID of an object it points to, and related information are maintained in a global data structure, dbtable.

As discussed below in connection with dbfaulting, unresolved dbpointers point to an unusable area of memory. An offset into this area gives the offset into a persistible object on disk that an unresolved dbpointer points to.

The rvalue of a resolved dbpointer is the address at which it points into a persistible object in memory.

dbtable

FIG. 1 illustrates dbtable, where

'lvalue' is the lvalue of a dbpointer,

'in-mem' indicates whether a persistible object is in memory,

'OID' is the OID of a persistible object,

'addr' is the address of a persistible object in memory,

'size' is the size of a persistible object, and

'typeobj' is the typeobject of a persistible object.

Null values are entered for the 'addr', 'size', and 'typeobj' fields for unfaulted persistible objects that have unresolved dbpointers pointing to them and for the 'lvalue' field for persistible objects that have no dbprinters pointing to them.

Several implementations of dbtable are possible, but those that provide a fast, indexed access for the 'lvalue' field are preferable.

Single Type System

Perhaps the biggest advantage of dbpointers is that they do not create any type-behavior differences between themselves and memory pointers. dbX has a single type system that is applicable for both persistible and transient objects. In fact, its type system is exactly the type system of the host language X.

In other persistent language models, type-behavior differences between long pointers and memory pointers lead to dual type systems. To overcome type-duality some models insert a phase into or rewrite a host language compiler.

dbX supports a single type system without introducing any compiler dependencies. Its implementation requires a preprocessor rather than a rewritten compiler or phase inserted into a compiler. (This preprocessor, referred to as 'dpp', is discussed below in connection with FIG. 3.)

dbfaulting

When a dbpointer to a persistible object not in memory is dereferenced, dbfaulting is triggered, and the object is restored into memory. As illustrated in FIGS. 2A and 2B, dbfaulting involves making all unresolved dbpointers point to an unusable area of memory, e.g., operating system area or system malloced area. This area is large enough to accommodate increments or decrements of unresolved dbpointers. An offset into this area is equal to an offset into a persistible object at which an unresolved dbpointer points. When a dbpointer to such an area is dereferenced, an object fault is triggered. The OID of an object to be faulted is obtained by looking up dbtable with the lvalue of a dereferenced dbpointer. (If the lvalue does not exist in dbtable, an error is flagged. This is a case of a memory pointer pointing to an unusable area of memory, because of a program error.) Upon resolution, a dbpointer is made to point at an appropriate offset into a faulted-in object. Other unresolved dbpointers to the same object are also fixed.

To implement dbfaulting, the preprocessor dpp replaces an occurrence of (*p) for a pointer p in a dbX program by code that looks like:

if (p>c1) && (p<c2)) then (*p) else fault (&p));

This code uses the lvalue, i.e., &p, in triggering dbfaulting when an unresolved dbpointer pointing to an unusable area of memory between locations c1 and c2 is dereferenced. The expression ((p>c1) && (p<c2)) may be optimized in various ways, e.g., by choosing c2 to be at the end of memory and thus avoiding the second conditional check.

dbfaulting adds to the safety of a program by catching increments or decrements of unresolved dbpointers that go beyond the size of an object being pointed. Also, it spots non-dbpointer memory pointers that point to an unusable area of memory used for dbfaulting.

dbpointer preprocessing

Assignment (or passing arguments by value) statements involving dbpointers are processed by a preprocessor dpp to update entries in dbtable with new lvalue—OID associations.

Besides dereferencing (including variations →, [ ]) and assignment, only operations involving == or !– and dbpointers require preprocessing. Thus, operators like <, >, ++, −− are ignored by dpp even if they operate on dbpointers. This is possible because an unresolved dbpointer to a persistible object on disk points into an unusable area of memory at the same offset as it would into the object if the object were in memory.

Functions definitions are processed by dpp to remove entries from dbtable for dbpointers on a runtime stack that disappear when a function invocation terminates.

dbvar, dbnew( )

To identify statically and dynamically allocated pieces of memory as persistible, a user uses the keyword 'dbvar' and the allocation operator 'dbnew( )' respectively in a dbX program. (The name 'dbnew' is skewed towards C++, but any other name appropriate to a host language may be substituted.)

For example, dbvar foo x;

where 'x' is a global variable, identifies the statically allocated memory for 'x' as persistible, and foo* p=dbnew(foo);
identifies the dynamically allocated piece of memory pointed to by 'p' as persistible.

(Note that 'dbvar' variables must have global extent, since we are assuming that a program is a transaction.)

dpp processes 'dbvar' and 'dbnew( )' occurrences in a dbX program and inserts code to update dbtable with OID, address, size, and typeobject information about allocated memory.

Data Flow Diagram

FIG. 3 shows the modules and data flow among them needed to support dbX. 'dpp' is a dbX preprocessor. Strictly speaking, the preprocessor should be referred to as dbXpp, since it depends on the host language X.

dpp takes as input a dbX program and generate X code, which is fed to a X compiler. To obtain typeobject and size information dpp interacts with a data dictionary module, which processes type declarations contained in a .h file.

dbtranslation

The save requirement is fulfilled by dbtranslation. Translating an object graph at runtime becomes complicated because of pointer casting and pointing to objects embedded in larger objects. dbtranslation uses a 'pointer view of memory' and an 'allocation view of memory' to determine the runtime structure of an object graph.

A pointer view of memory interprets a piece of memory according to the type of a pointer or reference to it. It is obtained by typeobjects, which are generated and maintained by a data dictionary module processing .h files containing type declarations. Typeobjects are a description of information related to an in-memory structure of an instance contained in a type declaration; in particular, they give the offsets for pointers in an instance. Typeobjects for types in 'dbvar' declarations are used to determine locations of pointers to be traversed when translating object graphs. (Note that during dbtranslation graph closures that include only memory allocated using 'dbnew( )' are traversed.)

In a sense, typeobjects give the "compile time structure" of an instance. They are by themselves inadequate in determining the runtime structure of an object graph, which may be different from the "compile time structure", because of casting and pointing to embedded instances.

As an example, consider:

```
dbvar struct afoo *ap;
struct bfoo {
    int a;
    afoo b;
    float c;
};
dbvar bfoo *bp = dbnew bfoo;
ap = &(bp→b);
```

Now ap points to an instance of afoo that is embedded in an instance of bfoo. The pointer views of memory for ap and bp are provided by the typeobjects for afoo and bfoo, but these views are inadequate to save the closures of dbvars ap and bp. In order to maintain sharing semantics during save, the fact that ap points to an instance that is embedded in an instance pointed to by bp must be taken into account; and this information cannot be deduced from the typeobjects for afoo and bfoo.

In addition to a pointer view of memory, dbtranslation employs an allocation view of memory to determine the runtime structure of an object graph. An allocation view of memory interprets a piece of memory based on how it is allocated. It is obtained by information about allocated memory—its typeobject, address, and size—which is entered into dbtable by code that dpp inserts when processing types in dbvar and dbnew( ) constructs. (A typeobject is needed for a type in a 'dbvar' and 'dbnew( )' allocation to obtain the location of a virtual function pointer, if any, in the allocated memory. As has already been mentioned, a typeobject for a type in a 'dbvar' declaration is also used to traverse an object graph during dbtranslation.) When a pointer in an object graph being saved is traversed, dbtable is looked up to determine allocation and embedding information about the piece of memory it points to.

Continuing with the above example, when saving closures of ap and bp, information in dbtable may be used to detect embedding of instances and maintain sharing semantics during translation.

When persistent data manipulated by an application program goes beyond virtual memory, dbtranslation may be used to swap out a portion of an object graph to disk. When an object graph is swapped out of virtual memory, dbtable is updated and dbpointers to the swapped object graph are fixed.

Note that dbtranslation does not require keeping track of pointer casting in an application code. Also, neither a data definition language nor annotation of type declarations with information about runtime structure of an object are required.

dbpaging

A more efficient way to save an object graph is dbpaging. Unlike dbtranslation, dbpaging avoids graph traversal, sharing detection, byte copying and graph linearization during save/restore. dbpaging involves several operations: allocating objects on a dbpage using dbnew( ), manipulating objects directly on a dbpage, transferring dbpages during save/restore, and maintaining a dbpagetable for objects and pointers on a dbpage.

When persistent data manipulated by an application program goes beyond virtual memory, dbswapping swaps dbpages out of virtual memory. When dbpages are swapped out of virtual memory, dbtable is updated and dbpointers to swapped dbpages are fixed.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of translating an object graph to be resilient to pointer casting and pointing to objects embedded in larger objects, comprising the steps of:

forming a typeobject having a description of information contained in a type declaration of an object graph;

determining a location of pointers, from the type declaration of the object graph, to be traversed to translate said object graph;

maintaining memory allocation of a memory including size, address, and typeobject in a single table, about a portion of said memory that comprise said object graph;

accessing said single table including said size, address and typeobject to determine whether an object is embedded in a larger object;

translating said object graph by traversing said pointers.

2. The method of claim 1, wherein said object graph is a C++ object graph.

3. The method of claim 1, and further comprising the step of using a preprocessor to process declarations and memory allocations of objects to enter said characteristics into said table.

4. The method of claim 3, wherein said object graph is a C++ object graph.

* * * * *